United States Patent
Jang et al.

(10) Patent No.: US 9,829,741 B2
(45) Date of Patent: Nov. 28, 2017

(54) WIRE GRID POLARIZER AND LIQUID CRYSTAL DISPLAY DEVICE HAVING THE SAME

(71) Applicant: SAMSUNG DISPLAY CO., LTD., Yongin, Gyeonggi-Do (KR)

(72) Inventors: Dae-Hwan Jang, Yongin (KR); Dae-Young Lee, Yongin (KR); Jung-Gun Nam, Yongin (KR); Gug-Rae Jo, Yongin (KR); Eun-Jung Kim, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 297 days.

(21) Appl. No.: 14/341,719

(22) Filed: Jul. 25, 2014

(65) Prior Publication Data

US 2015/0036083 A1    Feb. 5, 2015

(30) Foreign Application Priority Data

Aug. 2, 2013  (KR) .......................... 10-2013-0091949

(51) Int. Cl.
- *G02F 1/1335* (2006.01)
- *G02B 5/30* (2006.01)
- *G02F 1/1362* (2006.01)

(52) U.S. Cl.
CPC ..... *G02F 1/133528* (2013.01); *G02B 5/3058* (2013.01); *G02F 1/133502* (2013.01); *G02F 1/136209* (2013.01); *G02F 2001/133548* (2013.01)

(58) Field of Classification Search
None
See application file for complete search history.

(56) References Cited

U.S. PATENT DOCUMENTS

| | | | |
|---|---|---|---|
| 6,288,840 B1 | 9/2001 | Perkins et al. | |
| 6,898,851 B2 | 5/2005 | Nishioka et al. | |
| 2002/0070382 A1* | 6/2002 | Yamazaki | G02F 1/13454 257/72 |
| 2007/0019292 A1 | 1/2007 | Kim et al. | |
| 2007/0153204 A1* | 7/2007 | Kim | G02F 1/13439 349/141 |

(Continued)

FOREIGN PATENT DOCUMENTS

| | | |
|---|---|---|
| KR | 10-1002594 | 12/2010 |
| KR | 10-2012-0017263 | 2/2012 |
| WO | WO 00/79317 A1 | 12/2000 |

OTHER PUBLICATIONS

Korean Patent Abstracts Publication No. 10-2010-0050627 A, dated May 14, 2010, for KR 10-1002594, 1 page.

*Primary Examiner* — Richard Kim
(74) *Attorney, Agent, or Firm* — Lewis Roca Rothgerber Christie LLP

(57) ABSTRACT

A liquid crystal display device includes a wire grid polarizer, in which the wire grid polarizer is directly formed on a lower substrate, thereby decreasing the thickness of the liquid crystal display. In the wire grid polarizer formed on the lower substrate, a plurality of protective layers are formed on polarizing patterns that perform a polarizing function, so that it is possible to reduce or minimize the deterioration of characteristics of thin film transistors of the liquid crystal display, which are formed on the protective layers.

19 Claims, 2 Drawing Sheets

(56) References Cited

U.S. PATENT DOCUMENTS

| | | | |
|---|---|---|---|
| 2008/0100781 A1* | 5/2008 | Choo | G02F 1/133536 |
| | | | 349/96 |
| 2008/0252799 A1* | 10/2008 | Lee | G02B 5/3058 |
| | | | 349/5 |
| 2010/0079706 A1 | 4/2010 | Kim et al. | |
| 2011/0156995 A1* | 6/2011 | Choi | G02F 1/134363 |
| | | | 345/92 |
| 2012/0044523 A1 | 2/2012 | Kim | |
| 2013/0330531 A1* | 12/2013 | Moro | H01L 51/5237 |
| | | | 428/218 |
| 2014/0028956 A1* | 1/2014 | Choi | G02F 1/133528 |
| | | | 349/96 |

* cited by examiner

WIRE GRID POLARIZER AND LIQUID CRYSTAL DISPLAY DEVICE HAVING THE SAME

CROSS-REFERENCE TO RELATED APPLICATION

This application claims priority to and the benefit of Korean Patent Application No. 10-2013-0091949, filed on Aug. 2, 2013, in the Korean Intellectual Property Office, the entire content of which is incorporated herein by reference in its entirety.

BACKGROUND

1. Field

An aspect of the present invention relates to a liquid crystal display device, and more particularly, to a wire grid polarizer and a liquid crystal display device having the same.

2. Description of the Related Art

A liquid crystal display device is a device using the polarization phenomenon of light, and includes an upper substrate and a lower substrate, the upper and lower substrates having polarizing plates respectively attached thereto, and a liquid crystal layer interposed between the upper and lower substrates. In the liquid crystal display device, the arrangement of liquid crystal molecules constituting the liquid crystal layer is changed by applying a set or predetermined data signal to a plurality of pixels formed on the lower substrate, so that it is possible to control the transmission of light for each pixel, thereby displaying an image.

In the polarization phenomenon of the liquid crystal display device, light is first linearly polarized while passing through the polarizing plate attached to the lower substrate and then passes through the liquid crystal layer that rotates the polarization. Subsequently, the light passes through the polarizing plate attached to the upper substrate.

SUMMARY

Aspects of embodiments of the present invention are directed toward a liquid crystal display device having a wire grid polarizer, in which the wire grid polarizer is directly formed on a lower substrate, thereby decreasing the thickness of the liquid crystal display device.

Aspects of embodiments of the present invention are also directed toward the wire grid polarizer formed on the lower substrate in the liquid crystal display device, in which a plurality of protective layers are formed on polarizing patterns that perform a polarizing function, thereby reducing or minimizing the deterioration of characteristics of a thin film transistor formed on the protective layer.

According to an embodiment of the present invention, a wire grid polarizer includes: metal patterns on a transparent substrate; a first protective layer covering the metal patterns; and a second protective layer on the first protective layer and including a plurality of layers, the plurality of layers including a low dielectric material layer having a dielectric constant of no more than about 3.

The metal patterns may have a set line width and a set thickness, and may be formed in parallel in a stripe shape at a set distance apart along a first direction on a surface of the transparent substrate.

A ratio of the thickness to the line width of the metal patterns may be no less than 3:1. The line width of the metal patterns may be no more than about 60 nm, and the thickness of the metal patterns may be no less than about 150 nm.

The set distance between the metal patterns may be from about 50 nm to about 400 nm. The metal patterns may be formed using at least one metal selected from aluminum (Al), gold (Au), chrome (Cr), silver (Ag), copper (Cu), nickel (Ni), iron (Fe) or cobalt (Co), or an alloy thereof.

The first protective layer may include a material having a refractive index lower than that of the transparent substrate. The refractive index of the first protective layer may be no more than about 1.3.

The low dielectric material layer constituting the second protective layer may be a silicon carbide oxide (SiOC) layer. The thickness of the silicon carbide oxide (SiOC) layer may be from about 1 nm to about 2 nm.

The plurality of layers except the silicon carbide oxide (SiOC) layer may include at least one of silicon nitride (SiNx), silicon oxide (SiOx) or silicon oxide nitride (SiON).

According to an embodiment of the present invention, a liquid crystal display device includes: a lower substrate; a plurality of pixels on the lower substrate, each of the pixels having a thin film transistor and a pixel electrode; an upper substrate; a plurality of color filters on the upper substrate; a black matrix between the color filters on the upper substrate, the color filters respectively positioned in regions corresponding to the plurality of pixels; a liquid crystal layer between the upper and lower substrates; and a wire grid polarizer between one surface of the lower substrate and the thin film transistors, wherein the wire grid polarizer includes: a plurality of metal patterns on the one surface of the lower substrate; a first protective layer covering the metal patterns; and a second protective layer on the first protective layer and including a plurality of layers, the plurality of layers including a low dielectric material layer having a dielectric constant of no more than about 3.

The metal patterns formed in a region not overlapped with the black matrix each may have a set line width and a set line thickness, and may be formed in parallel in a stripe shape at a set distance apart along a first direction on the one surface of the lower substrate. A ratio of the thickness to the line width of each of the metal patterns may be no less than 3:1. The line width of each of the metal patterns may be no more than about 60 nm, and the thickness of each of the metal patterns may be no less than about 150 nm.

A metal pattern of the metal patterns formed in a region overlapped with the black matrix may be formed to have the same breadth (e.g. width) as the black matrix. The low dielectric material layer constituting the second protective layer may be a silicon carbide oxide (SiOC) layer. The thickness of the silicon carbide oxide (SiOC) layer may be from about 1 nm to about 2 nm. The plurality of layers except the silicon carbide oxide (SiOC) layer may include at least one selected from silicon nitride (SiNx), silicon oxide (SiOx) and silicon oxide nitride (SiON).

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawings, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
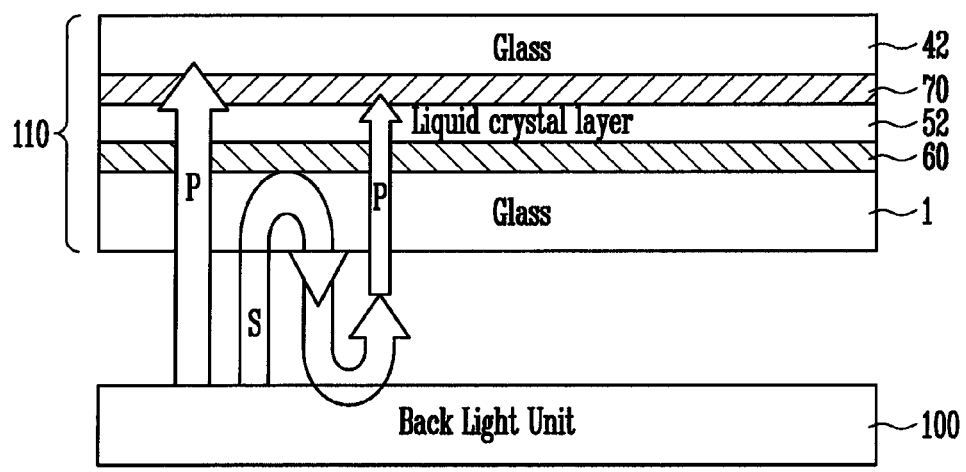
FIG. 1 is a view illustrating an operation of a liquid crystal display device according to an embodiment of the present invention.

In the following detailed description, only certain example embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements. Expressions such as "at least one of," when preceding a list of elements, modify the entire list of elements and do not modify the individual elements of the list. Further, the use of "may" when describing embodiments of the present invention refers to "one or more embodiments of the present invention."

FIG. 1 is a view illustrating an operation of a liquid crystal display device according to an embodiment of the present invention.

In the liquid crystal display device according to this embodiment, a wire grid polarizer is directly formed on one surface of a substrate, rather than a separate polarizing plate of a comparable liquid crystal display device.

In order to polarize visible light having a wavelength of 400 to 800 nm, the wire grid polarizer is configured by forming, on the substrate, metal patterns having a pitch shorter than the wavelength of visible light. Accordingly, it is possible to decrease the thickness of the liquid crystal display device and to have an excellent thermal resistance, as compared with the polarizing plate of a comparable liquid crystal display device.

The wire grid polarizer performs an operation of transmitting a P-wave component of light and reflecting an S-wave component of the light. The operation of the liquid crystal display device according to this embodiment will be described in more detail as follows.

As shown in FIG. 1, light generated in the back light unit 100 is transferred to a liquid crystal panel 110, and wire grid polarizers 60 and 70 are respectively formed on one surface of the lower and upper substrates 1 and 42 constituting the liquid crystal panel 110.

A liquid crystal layer 52 is interposed between the substrates 1 and 42. Although not shown in this figure, a plurality of pixels each including a thin film transistor TFT and a pixel electrode are formed on (above) the lower substrate 1, and a plurality of color filters respectively corresponding to the pixels and a black matrix positioned between the color filters are formed on (below) the upper substrate 42. In addition, alignment layers are respectively formed on the surfaces of the upper and lower substrates to face the liquid crystal layer 52.

Accordingly, in the light generated in the back light unit 100, only the P-wave component is transmitted by the wire grid polarizer 60 formed on the lower substrate 1, and the S-wave component is reflected.

However, after the reflected S-wave component is scattered by a light guide plate provided in the back light unit 100 so that its polarization property is offset, and then again reflected by a reflective plate provided in the back light unit 100 to be again transferred to the liquid crystal panel 110. In this case, only the P-wave component is again transmitted, and the S-wave component is again reflected.

In FIG. 1, the intensity of light is represented by the thickness of the arrow. That is, about a half of the light generated in the back light unit 100 (the P-wave component) is primarily incident onto the liquid crystal panel 110, and the other half of the light generated in the back light unit 100 (the S-wave component) is again used as a light source (after being reflected by the reflective plate). Accordingly, it is possible to improve the use efficiency of the light generated in the back light unit 100.

However, if metal patterns constituting the wire grid polarizer 60 are formed on the lower substrate 1, thin film transistors are necessarily formed on the metal patterns, and, therefore, a protective layer is necessarily formed on the metal patterns.

The process of forming the thin film transistors should be possible only when the protective layer is formed on the metal patterns. The function of the protective layer is important to protect the thin film transistors so that the metal patterns effectively have no influence on characteristics of the thin film transistors formed thereon.

That is, in a case where the protective layer does not perform this function, capacitance is formed between the metal patterns and the thin film transistors, and therefore, the performance of the thin film transistors may be lowered.

For example, if a silicon nitride (SiNx) layer generally used in the liquid crystal display device is used as the protective layer formed on the metal patterns, the I-V characteristic of the thin film transistor is changed. In order to overcome such a problem, the thickness of the silicon nitride layer is necessarily increased. In this case, the thickness of the silicon nitride layer, however, cannot be increased to 6000 Å or more due to the problem of glass stress among properties of glass (a material of the the lower substrate 1).

Accordingly, in this embodiment, in order to overcome such a problem, a plurality of protective layers including a low dielectric material are formed on polarizing patterns of the wire grid polarizer 60 formed on the lower substrate 1.

Hereinafter, the configuration and material of the wire grid polarizer according to this embodiment and the configuration of the liquid crystal layer will be described in more detail with reference to FIGS. 2 and 3.

Figure 2:
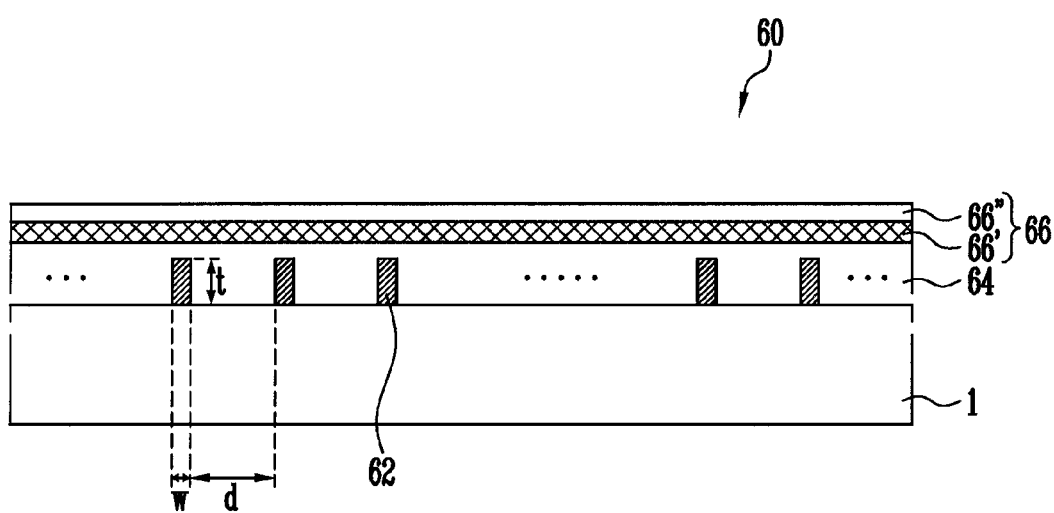
FIG. 2 is a sectional view of a wire grid polarizer according to an embodiment of the present invention.

FIG. 2 is a sectional view of the wire grid polarizer according to an embodiment of the present invention.

The case where the wire grid polarizer 60 is formed on the lower substrate 1 of the liquid crystal display device is described as an example.

However, this is merely one embodiment, and the present invention is not necessarily limited thereto. Accordingly, the wire grid polarizer 70 formed on the upper substrate 42 can be implemented with the configuration and material of FIG. 2.

Referring to FIG. 2, the wire grid polarizer 60 according to this embodiment includes metal patterns 62 formed on a transparent substrate 1, a first protective layer 64 formed to cover the metal patterns 62, and a second protective layer 66 formed on the first protective layer 64.

The transparent substrate 1 is the lower substrate of the liquid crystal display device, and may include glass. In addition to the glass, the transparent substrate 1 may include, as a high heat-resistance transparent material, a polymer (or plastic) material which can endure the deposition temperature.

The metal patterns 62 are formed in a wire grid shape. In this case, the metal patterns 62 are formed in parallel in a stripe shape at a set distance d apart along a first direction (to have a first direction at a set or predetermined distance d) on a surface of the transparent substrate 1.

The metal patterns 62 each have a set or predetermined line width w and line thickness t. The polarizing efficiency and characteristic of the wire grid polarizer are changed depending on the distance between the metal patterns and the line width w and the line thickness t of each of the metal patterns.

In this embodiment, the ratio of the thickness t to the line width w of each of the metal patterns 62 is no less than 3:1. The line width w of each of the metal patterns 62 is no more than 60 nm, and the thickness t of each of the metal patterns 62 is no less than 150 nm.

The distance d between the metal patterns 62 may be about 50 to 400 nm. If the distance d is less than 50 nm, the polarization effect frequently occurs in a UV region, which is not preferable. In addition, a delicate manufacturing process is required, thereby lowering the productivity. If the distance d exceeds 400 nm, the polarization characteristic is insufficient, and the polarization effect frequently occurs in an infrared region.

The metal patterns 62 formed in the wire grid shape may be formed using any one metal selected from aluminum (Al), gold (Au), chrome (Cr), silver (Ag), copper (Cu), nickel (Ni), iron (Fe), cobalt (Co), and alloys thereof.

In addition, the metal patterns 62 may be formed using photolithography, hologram lithography, E-beam lithography, lift-off, sputtering, etc.

After the metal patterns 62 are formed, the first protective layer 64 is formed on the metal patterns 62 to cover the metal patterns 62, and the second protective layer 66 having a laminated structure of layers made of a plurality of materials is formed on the first protective layer 64.

First, the first protective layer 64 is made of a material having a low refractive index property. The first protective layer 64 performs a function of protecting the metal patterns 62 and maintaining the transmittance.

For, example, the first protective layer 64 has a refractive index lower than that of the transparent substrate. In a case where the transparent substrate is made of a glass material, the refractive index of glass is 1.5. Therefore, in one embodiment, the first protective layer 64 is made of a material with a refractive index of 1.3 or less.

The material with the refractive index of 1.3 or less may include nano-clustering silica, nanoporous silica, etc.

In this case, the nano-clustering silica may be prepared by forming nano cluster precursors in a commander, using a silica source monomer.

The nanoporous silica may be prepared through a sol-gel process, etc.

Next, the second protective layer 66 is made of a material having low dielectric property. The second protective layer 66 protects the first protective layer 64 (which is weak against a wet etchant), and serves as a shield between the metal patterns 62 and thin film transistors to be formed on the second protective layer 66. To this end, the second protective layer 66 includes a material that is etching resistance and has a low dielectric constant.

In this embodiment, the second protective layer 66 is formed into a laminated structure of layers 66' and 66" made of a plurality of materials, and at least one of the plurality of materials is a material having a low dielectric property in which its dielectric constant is lower than that of silicon nitride (SiNx).

In this case, the low dielectric material having a dielectric constant lower than that the silicon nitride (SiNx) includes silicon carbide oxide (SiOC), silicon oxide (SiOx) and silicon oxide nitride (SiON).

That is, while the dielectric constant of the silicon nitride (SiNx) is about 7.5 (F/m) or less, the dielectric constant of the silicon oxide nitride (SiON) is 4 to 7 (F/m). The dielectric constant of the silicon oxide (SiOx) is 3.9 (F/m) or less, and the dielectric constant of the silicon carbide oxide (SiOC) is 3 (F/m) or less.

The silicon carbide oxide (SiOC) has a low dielectric constant and can be deposited to a high thickness at a short (fast) time. Hence, in one embodiment, at least one layer 66' among the plurality of layers constituting the second protective layer 66 is formed as a silicon carbide oxide (SiOC) layer.

Accordingly, in this embodiment, the second protective layer 66 is implemented with a plurality of layers including the silicon carbide oxide (SiOC) layer 66' in order to improve the adhesion and transmittance of the silicon carbide oxide (SiOC) layer. In this case, the plurality of layers 66 except the silicon carbide oxide (SiOC) layer 66' may be implemented as layers made of silicon nitride (SiNx), silicon oxide (SiOx) and/or silicon oxide nitride (SiON).

Here, the thickness of the silicon carbide oxide (SiOC) layer 66' constituting the second protective layer 66 is about 1 to 2 nm.

If the thickness of the silicon carbide oxide (SiOC) layer 66' is less than 1 nm, capacitance is formed between the metal patterns 62 and the thin film transistors, and therefore, the performance of the thin film transistors may be lowered. If the thickness of the silicon carbide oxide (SiOC) layer 66' exceeds 2 nm, the compressive force applied to the lower (e.g., glass) substrate 1 is increased, and therefore, there may occur a problem of adhesion and a problem in that the glass substrate 1 is warped.

Figure 3:
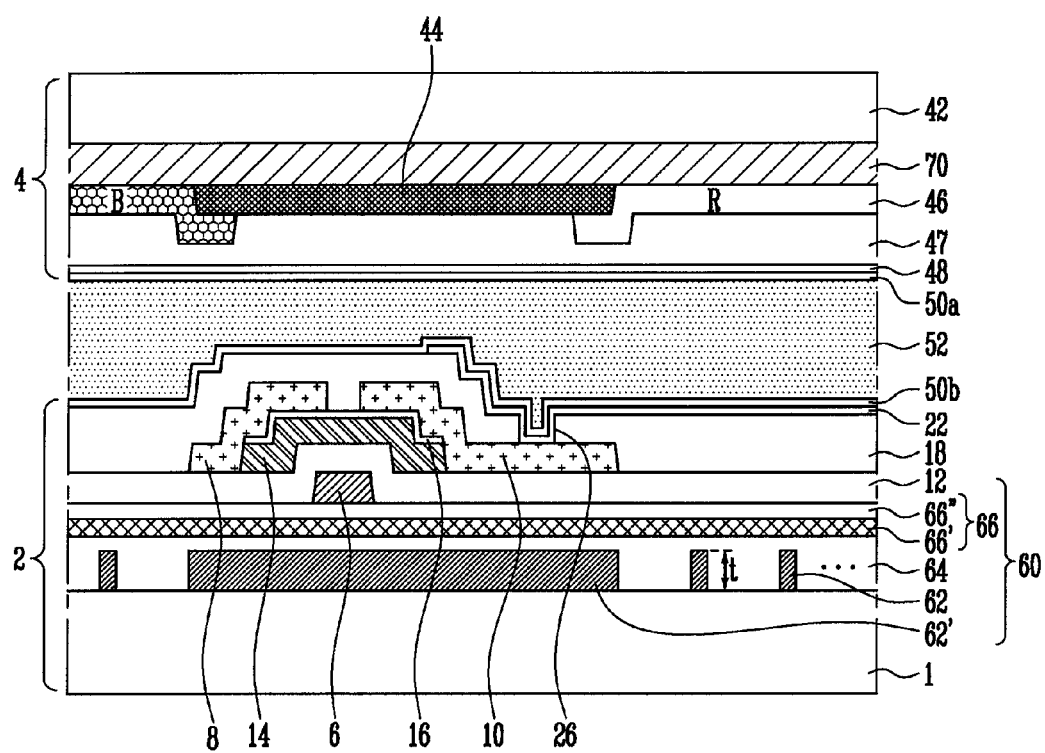
FIG. 3 is a schematic sectional view of a liquid crystal display device integrated with a wire grid polarizer according to an embodiment of the present invention.

FIG. 3 is a schematic sectional view of a liquid crystal display device integrated with a wire grid polarizer according to an embodiment of the present invention.

In the liquid crystal display device shown in FIG. 3, the TN mode in which a common electrode is formed on the upper substrate is described as an example. However, this is merely one embodiment, and the present invention is not necessarily limited thereto.

Referring to FIG. 3, the liquid crystal display device integrated with the wire grid polarizer according to this embodiment includes a color filter array substrate 4 including (configured with) a black matrix 44, a color filter 46, an overcoat layer 47, a common electrode 48 and an upper alignment layer 50a, which are sequentially formed on (below) an upper substrate 42; a thin film transistor (TFT) array substrate 2 including (configured with) a TFT, a pixel electrode 22 and a lower alignment layer 50b, which are formed on (above) a lower substrate 1; and a liquid crystal layer 52 injected into a space between the color filter array substrate 4 and the TFT array substrate 2.

In this embodiment, a wire grid polarizer 60 is directly formed on one surface of the lower substrate 1.

In this case, the specific configuration of the wire grid polarizer 60 has been described with reference to FIG. 2. Accordingly, components identical to those shown in FIG. 2, i.e., metal patterns 62, a first protective layer 64 and a second protective layer 66, are designated by like reference numerals, and their detailed descriptions will not be repeated.

As shown in this figure, another wire grid polarizer 70 may also be formed on one surface of the upper substrate 42. However, the present invention is not limited thereto. That is, a polarizing plate may be attached to the upper substrate.

The TFT of the TFT array substrate 2 is formed on the second protective layer 66 of the wire grid polarizer 60 formed on the lower substrate 1. The TFT includes a gate electrode 6 connected to a gate line, a source electrode 8 connected to a data line, and a drain electrode 10 connected to the pixel electrode 22 through a drain contact hole 26.

The TFT further includes semiconductor layers 14 and 16 configured to allow a conducting channel between the source and drain electrodes 8 and 10 to be formed by a gate voltage supplied to the gate electrode 6.

The TFT selectively supplies a data signal from the data line to the pixel electrode 22, in response to a gate signal from the gate line.

The pixel electrode 22 is positioned in a pixel region defined by the data and gate lines. The pixel electrode 22 is made of a transparent conductive material having high light transmittance.

The pixel electrode 22 is formed on a protective film 18 applied to a front surface of the lower substrate 1. The pixel electrode 22 is electrically connected to the drain electrode 10 through the drain contact hole 26 passing through the protective film 18. The pixel electrode 22 generates a potential difference with the common electrode 48 formed on the upper substrate 42, in response to the data signal supplied via the TFT.

Liquid crystals in the liquid crystal layer 52 positioned between the lower and upper substrates 1 and 42 are rotated due to dielectric anisotropy caused by the potential difference. The amount of light transmitted toward the upper substrate 42 from a light source via the pixel electrode 22 is adjusted by the liquid crystals rotated in the liquid crystal layer 52.

The black matrix 44 of the color filter array substrate 4 is formed to overlap with a TFT region of the lower substrate 1 and gate and data line regions, and defines the pixel region in which the color filter 46 is to be formed. The black matrix 44 performs a function of preventing light leakage and increasing contrast by absorbing external light.

The color filter 46 is formed in the pixel region defined by the black matrix 44. The color filter 46 includes red (R), green (G) and blue (B) color filters, which respectively implement red (R), green (G) and blue (B) color.

The overcoat layer 47 is formed by applying a transparent resin with an insulation property on the upper substrate 42 having the color filter 46 formed thereon. The overcoat layer 47 performs a function of electrically insulating the black matrix 44 to which a certain voltage is applied from the common electrode 48 to which a common voltage is applied.

The common voltage that becomes a reference in the driving of liquid crystals is applied to the common electrode 48 so that the common electrode 48 generates a potential difference with the pixel electrode 22 formed on the lower substrate 1. Meanwhile, the common electrode 48 is formed on the lower substrate 1 in an IPS mode.

The upper/lower alignment layers 50a and 50b for aligning the liquid crystals are respectively formed on the color filter array substrate 4 and the TFT array substrate 2. In this case, the upper/lower alignment layers 50a and 50b are formed by applying an alignment material such as polyimide (PI) and then performing a rubbing process on the applied alignment material.

The wire grid polarizer 60 formed on the lower substrate 1 performs a function of polarizing light incident from a back light unit attached to a rear surface of the lower substrate 1, and the wire grid polarizer 70 formed on the upper substrate 42 performs a function of polarizing light radiated from a liquid crystal panel.

In the embodiment shown in FIG. 3, the line width of a metal pattern 62' formed at the position overlapped with the black matrix among the metal patterns of the wire grid polarizer 60 formed on the lower substrate 1 is formed different from that of the metal patterns 62 formed in another region.

This is because, as the area overlapped with the black matrix is a non-display area through which light is not transmitted, it is unnecessary to perform the function of polarization. In addition, the area overlapped with the black matrix may be formed to the same breadth as the black matrix in order to prevent light leakage.

That is, the width of the metal pattern 62' formed in the non-display area may be formed wider than that of the metal patterns 62 formed in a display area.

In this case, the second protective layer 66 of the wire grid polarizer 60, however, has a laminated structure of layers made of the same material as described in the embodiment of FIG. 2 in order to overcome the problem in that capacitance is formed between the metal pattern 62' having a wide width and the TFT positioned above the metal pattern 62'.

By way of summation and review, the polarizing plate used in a comparable liquid crystal display device is necessarily attached to a substrate, and therefore, the manufacturing cost of the liquid crystal display device is increased. In addition, the entire thickness of the liquid crystal display device is increased due to the thickness of the polarizing plate, and the application of a manufacturing process of the liquid crystal display device is limited due to weak durability and heat resistance of the polarizing plate.

In the wire grid polarizer and the liquid crystal display device having the same according to embodiments of the present invention, the wire grid polarizer is directly formed on the lower substrate. Thus, a separate polarizing plate is not required, and a separate process of attaching the polarizing plate is not required. Accordingly, it is possible to decrease the thickness of the liquid crystal display device and to reduce the manufacturing cost of the liquid crystal display device.

Further, the plurality of protective layers are formed on the polarizing patterns of the wire grid polarizer formed on the lower substrate, so that it is possible to reduce or minimize the deterioration of characteristics of the thin film transistors formed on the lower substrate.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singularly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims, and equivalents thereof.

What is claimed is:

1. A wire grid polarizer, comprising:
   metal patterns on a transparent substrate;
   a first protective layer covering the metal patterns; and
   a second protective layer on the first protective layer and comprising a plurality of layers, the plurality of layers comprising a low dielectric material layer having a dielectric constant of no more than about 3,
   wherein the metal patterns are configured with the first and second protective layers as the wire grid polarizer to linearly polarize light.

2. The wire grid polarizer of claim 1, wherein the metal patterns each have a set line width and a set line thickness, and are formed in parallel in a stripe shape at a set distance apart along a first direction on a surface of the transparent substrate.

3. The wire grid polarizer of claim 1, wherein a ratio of the thickness to the line width of each of the metal patterns is no less than 3:1, and
   wherein the line width of each of the metal patterns is no more than about 60 nm, and the thickness of each of the metal patterns is no less than about 150 nm.

4. The wire grid polarizer of claim 1, wherein the set distance between the metal patterns is from about 50 nm to about 400 nm.

5. The wire grid polarizer of claim 1, wherein the metal patterns are formed using at least one metal selected from aluminum (Al), gold (Au), chrome (Cr), silver (Ag), copper (Cu), nickel (Ni), iron (Fe), cobalt (Co), and alloys thereof.

6. The wire grid polarizer of claim 1, wherein the first protective layer comprises a material having a refractive index lower than that of the transparent substrate.

7. The wire grid polarizer of claim 6, wherein the refractive index of the first protective layer is no more than about 1.3.

8. The wire grid polarizer of claim 1, wherein the low dielectric material layer constituting the second protective layer is a silicon carbide oxide (SiOC) layer.

9. The wire grid polarizer of claim 8, wherein the thickness of the silicon carbide oxide (SiOC) layer is from about 1 nm to about 2 nm.

10. The wire grid polarizer of claim 8, wherein the plurality of layers except the silicon carbide oxide (SiOC) layer comprises at least one selected from silicon nitride (SiNx), silicon oxide (SiOx) and silicon oxide nitride (SiON).

11. The wire grid polarizer of claim 1, wherein the second protective layer is directly on the entire first protective layer.

12. A liquid crystal display device, comprising:
   a lower substrate;
   a plurality of pixels on the lower substrate, each of the pixels having a thin film transistor and a pixel electrode;
   an upper substrate;
   a plurality of color filters on the upper substrate; a black matrix between the color filters on the upper substrate, the color filters respectively positioned in regions corresponding to the plurality of pixels;
   a liquid crystal layer between the upper and lower substrates; and
   a wire grid polarizer between one surface of the lower substrate and the thin film transistors,
   wherein the wire grid polarizer comprises:
   a plurality of metal patterns on the one surface of the lower substrate;
   a first protective layer covering the metal patterns; and
   a second protective layer on the first protective layer and comprising a plurality of layers, the plurality of layers comprising a low dielectric material layer having a dielectric constant of no more than about 3.

13. The liquid crystal display device of claim 12, wherein the metal patterns formed in a region not overlapped with the black matrix each have a set line width and a set line thickness, and are formed in parallel in a stripe shape at a set distance apart along a first direction on the one surface of the lower substrate.

14. The liquid crystal display device of claim 13, wherein a ratio of the thickness to the line width of each of the metal patterns is no less than 3:1, and
   wherein the line width of each of the metal patterns is no more than about 60 nm, and the thickness of each of the metal patterns is no less than about 150 nm.

15. The liquid crystal display device of claim 12, wherein a metal pattern of the metal patterns formed in a region overlapped with the black matrix is formed to have the same breadth as the black matrix.

16. The liquid crystal display device of claim 12, wherein the low dielectric material layer constituting the second protective layer is a silicon carbide oxide (SiOC) layer.

17. The liquid crystal display device of claim 16, wherein the thickness of the silicon carbide oxide (SiOC) layer is from about 1 nm to about 2 nm.

18. The liquid crystal display device of claim 16, wherein the plurality of layers except the silicon carbide oxide (SiOC) layer comprises at least one selected from silicon nitride (SiNx), silicon oxide (SiOx) and silicon oxide nitride (SiON).

19. The liquid crystal display device of claim 12, wherein the second protective layer is directly on the entire first protective layer.

* * * * *